(12) United States Patent
Lehtikangas et al.

(10) Patent No.: US 12,402,194 B2
(45) Date of Patent: Aug. 26, 2025

(54) AD HOC RADIO BASE STATION (71) Applicant: EXFO OY, Oulu (FI)

(72) Inventors: Juha Olavi Lehtikangas, Oulu (FI); Tuure Risto Makela, Oulu (FI); Antti Mauno Ilmari Jaaski, Oulu (FI); Taisto Antero Niiranen, Li (FI)

(73) Assignee: EXFO OY, Oulu (FI)

( * ) Notice: Subject to any disclaimer, the term of this patent is extended or adjusted under 35 U.S.C. 154(b) by 315 days.

(21) Appl. No.: 18/184,240

(22) Filed: Mar. 15, 2023

(65) Prior Publication Data

US 2023/0300779 A1 Sep. 21, 2023

Related U.S. Application Data (60) Provisional application No. 63/320,831, filed on Mar. 17, 2022.

(51) Int. Cl.
H04W 4/00 (2018.01)
H04W 16/28 (2009.01)
(Continued)

(52) U.S. Cl.
CPC ....... *H04W 74/0833* (2013.01); *H04W 16/28* (2013.01); *H04W 36/06* (2013.01);
(Continued)

(58) Field of Classification Search
CPC . H04W 74/0833; H04W 16/28; H04W 36/06; H04W 64/00; H04W 76/10;
(Continued)

(56) References Cited

U.S. PATENT DOCUMENTS

| 7,667,646 B2 | 2/2010 | Kalliola et al. |
| 9,584,252 B1 | 2/2017 | Salyers et al. |
| (Continued) | | |

FOREIGN PATENT DOCUMENTS

| CN | 201985870 U | 9/2011 |
| CN | 105282778 A | 1/2016 |
| (Continued) | | |

OTHER PUBLICATIONS

Agneesens et al., Design of a Wearable, Low-Cost, Through-Wall Doppler Radar System, Hindawi Publishing Corporation, International Journal of Antennas and Propagation, vol. 2012, Article ID 840924, 9 pages [online], [retrieved on Jan. 22, 2024]. Retrieved from the Internet <URL: https://www.hindawi.com/journals/ijap/2012/840924/> <DOI: 10.1155/2012/8409242012-08-05>.

(Continued)

*Primary Examiner* — Omoniyi Obayanju
(74) *Attorney, Agent, or Firm* — Baratta Law PLLC; Lawrence A. Baratta, Jr.

(57) ABSTRACT

An ad hoc radio base station and a method for locating a user apparatus are presented. The method comprises setting up two ad hoc cells, a first cell of the two ad hoc cells providing an omnidirectional cell and a second cell of the ad hoc cells providing a directional cell, utilizing a set of directional or beamforming antennas, the main lobes of the antennas of the cells being directed at different directions from each other, one antenna of the second cell being active at a time; setting up a radio connection in one of the two ad hoc cells to an user apparatus; obtaining information on the signal-to-noise ratio measured by the user apparatus from of the signal received by the user apparatus and Timing Advance required on the radio connection; transmitting a redirection message to other cell in the first radio connection to the user apparatus.

20 Claims, 8 Drawing Sheets (51) Int. Cl.
*H04W 36/06* (2009.01)
*H04W 64/00* (2009.01)
*H04W 74/0833* (2024.01)
*H04W 76/10* (2018.01)
*H04W 76/20* (2018.01)
*H04W 84/18* (2009.01)

(52) U.S. Cl.
CPC ........... *H04W 64/00* (2013.01); *H04W 76/10* (2018.02); *H04W 76/20* (2018.02); *H04W 84/18* (2013.01)

(58) Field of Classification Search
CPC ..... H04W 76/20; H04W 84/18; H04W 60/00; H04W 48/18; H04W 88/08
See application file for complete search history.

(56) References Cited

U.S. PATENT DOCUMENTS

| | | | |
|---|---|---|---|
| 9,801,215 | B2 | 10/2017 | Schwartz |
| 10,075,928 | B2 | 9/2018 | Islam et al. |
| 10,416,268 | B2 | 9/2019 | Fenn et al. |
| 10,694,334 | B2 | 6/2020 | Kumar et al. |
| 10,726,167 | B2 | 7/2020 | Santarone et al. |
| 10,782,138 | B2 | 9/2020 | Kaiser et al. |
| 11,296,765 | B2 | 4/2022 | Wigren et al. |
| 11,378,641 | B2 | 7/2022 | Hulvey |
| 11,500,053 | B2 | 11/2022 | Sinclair et al. |
| 11,533,700 | B2 | 12/2022 | Duan et al. |
| 11,587,121 | B2 | 2/2023 | Ueno et al. |
| 2008/0214212 | A1 | 9/2008 | Pridmore et al. |
| 2010/0113025 | A1 | 5/2010 | Martin et al. |
| 2010/0273504 | A1 | 10/2010 | Bull et al. |
| 2010/0302992 | A1 | 12/2010 | Zhuang |
| 2011/0319010 | A1 | 12/2011 | Nelkenbaum |
| 2018/0234157 | A1* | 8/2018 | Liang .................. H04L 5/0048 |
| 2019/0120954 | A1 | 4/2019 | Kim et al. |
| 2020/0145830 | A1 | 5/2020 | Wang et al. |
| 2021/0377749 | A1 | 12/2021 | Taherzadeh Boroujeni et al. |
| 2022/0109959 | A1 | 4/2022 | Shrestha et al. |
| 2022/0110088 | A1 | 4/2022 | Bao et al. |
| 2022/0120842 | A1 | 4/2022 | Edge et al. |
| 2022/0311488 | A1 | 9/2022 | Shreevastav et al. |
| 2022/0365164 | A1 | 11/2022 | Kumar et al. |
| 2023/0262547 | A1* | 8/2023 | Zeng .................. H04W 36/322 370/331 |
| 2023/0300896 | A1 | 9/2023 | Kemppainen et al. |

FOREIGN PATENT DOCUMENTS

| | | |
|---|---|---|
| EP | 1908318 B1 | 12/2010 |
| EP | 2779714 A1 | 9/2014 |
| EP | 3032883 A2 | 6/2016 |
| EP | 3032883 A3 | 6/2016 |
| EP | 3208990 A1 | 8/2017 |
| EP | 3573304 A1 | 11/2019 |
| EP | 3693754 A1 | 8/2020 |
| WO | 2018002154 A1 | 1/2018 |
| WO | 2021151497 A1 | 8/2021 |
| WO | 2021178387 A1 | 9/2021 |
| WO | 2021257047 A1 | 12/2021 |
| WO | 2021262570 A1 | 12/2021 |
| WO | 2022197851 A1 | 9/2022 |
| WO | 2022211889 A1 | 10/2022 |

OTHER PUBLICATIONS

Peavey et al., The Single Channel Interferometer using a Pesudo-Doppler Direction Finding System, Dec. 31, 1997, Publication Year: 1997, pp. 4129-4132 vol.5, IEEE [online], [retrieved on Jan. 22, 2024]. Retrieved from the Internet <URL: https://www2.spsc.tugraz.at/people/franklyn/ICASSP97/pdf/scan/ic974129.pdf> <DOI: 10.1109/ICASSP.1997.604855>.

* cited by examiner

AD HOC RADIO BASE STATION

CROSS-REFERENCE

The present disclosure claims priority to U.S. Provisional Patent No. 63/320,831, filed Mar. 17, 2022, the contents of which are incorporated by reference in their entirety.

FIELD

Various embodiments relate to an ad hoc radio base station, and a method for locating a user apparatus served by the ad hoc base station.

BACKGROUND

An ad hoc radio base station implements an ad hoc (created for a particular purpose as necessary) cell to operate in parallel with existing (usually permanent) cells. The ad hoc radio base station may be used in a surveillance operation, for example. As pre-planning of the ad hoc cell may not be possible, and co-operation with existing cellular radio network infrastructure may be minimal, operation of the ad hoc radio base station needs to be sophisticated to enable flexible and easy operation.

BRIEF DESCRIPTION

According to an aspect, there is provided subject matter of independent claims. Dependent claims define some embodiments.

According to an aspect, there is provided an ad hoc radio base station, comprising: one or more radio transceivers configured to receive and transmit in a cellular radio network; and one or more processors configured to cause performance of at least the following: setting up two ad hoc cells, each cell on a channel number with a Physical Cell ID, PCID and a Tracking Area Code, TAC or a Scrambling Code and a Location Area Code (LAC)/Routing Area Code (RAC); a first cell of the two ad hoc cells providing an omnidirectional cell; a second cell of the ad hoc cells providing a directional cell, utilizing a set of directional or beamforming antennas, the main lobes of the antennas of the cells being directed at different directions from each other, one antenna of the second cell being active at a time; setting up a radio connection in one of the two ad hoc cells to an user apparatus using a Random Access Channel, RACH, procedure; obtaining information on the signal-to-noise ratio measured by the user apparatus from of the signal received by the user apparatus and Timing Advance required on the radio connection; transmitting a Radio Resource Control, RRC, release message with a redirection to other cell of the two ad hoc cells in the first radio connection to the user apparatus, repeating the above obtaining and transmitting steps a given number of times; determining the location of the user apparatus based on the obtained information.

According to an aspect, there is provided a method for locating a user apparatus, comprising: setting up two ad hoc cells, each cell on a channel number with a Physical Cell ID, PCID and a Tracking Area Code, TAC or a Scrambling Code and a Location Area Code (LAC)/Routing Area Code (RAC); a first cell of the two ad hoc cells providing an omnidirectional cell; a second cell of the ad hoc cells providing a directional cell, utilizing a set of directional or beamforming antennas, the main lobes of the antennas of the cells being directed at different directions from each other, one antenna of the second cell being active at a time; setting up a radio connection in one of the two ad hoc cells to an user apparatus using a Random Access Channel, RACH, procedure; obtaining information on the signal-to-noise ratio measured by the user apparatus from of the signal received by the user apparatus and Timing Advance required on the radio connection; transmitting a Radio Resource Control, RRC, release message with a redirection to other cell of the two ad hoc cells in the first radio connection to the user apparatus, repeating the above obtaining and transmitting steps a given number of times; determining the location of the user apparatus based on the obtained information.

According to an aspect, there is provided a computer-readable medium comprising computer program code, which, when executed by one or more microprocessors, causes performance of: setting up two ad hoc cells, each cell on a channel number with a Physical Cell ID, PCID and a Tracking Area Code, TAC or a Scrambling Code and a Location Area Code (LAC)/Routing Area Code (RAC); a first cell of the two ad hoc cells providing an omnidirectional cell; a second cell of the ad hoc cells providing a directional cell, utilizing a set of directional or beamforming antennas, the main lobes of the antennas of the cells being directed at different directions from each other, one antenna of the second cell being active at a time; setting up a radio connection in one of the two ad hoc cells to an user apparatus using a Random Access Channel, RACH, procedure; obtaining information on the signal-to-noise ratio measured by the user apparatus from of the signal received by the user apparatus and Timing Advance required on the radio connection; transmitting a Radio Resource Control, RRC, release message with a redirection to other cell of the two ad hoc cells in the first radio connection to the user apparatus, repeating the above obtaining and transmitting steps a given number of times; determining the location of the user apparatus based on the obtained information.

In an embodiment, the main lobes of the directional or beamforming antennas of the second cell are perpendicular to each other.

In an embodiment, the second cell of the ad hoc cells utilizes four directional or beamforming antennas each providing a main lobe on the same horizontal plane and perpendicular to each other and a fifth directional antenna, the main lobe of the fifth antenna being perpendicular to the main lobes of the four other directional antennas.

One or more examples of implementations are set forth in more detail in the accompanying drawings and the description of embodiments.

LIST OF DRAWINGS

Some embodiments will now be described with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

In following, LTE is used as an example of a system where embodiments of the invention are applied. However, embodiments can be applying in other mobile systems as well, as one skilled in the art is aware. Examples of possible systems include 3G and 5G (or NR, New Radio). The embodiments are not depending on any LTE specific features.

Figure 1:
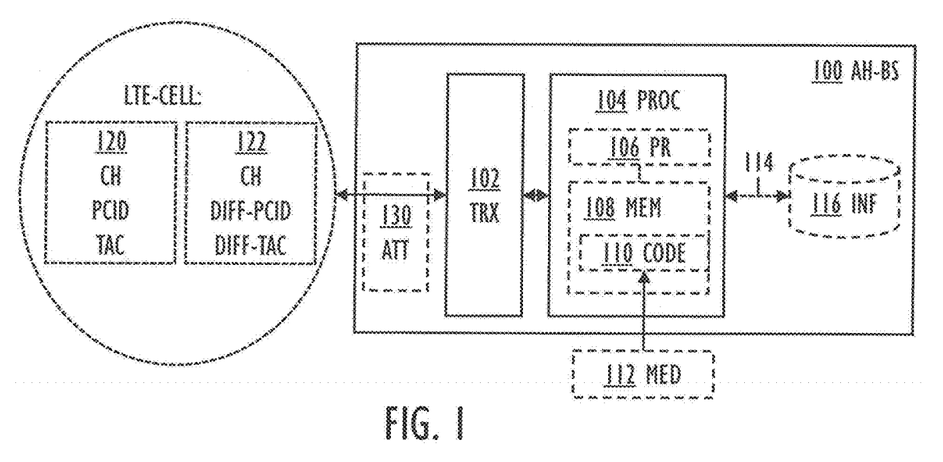
FIG. 1 illustrates embodiments of an ad hoc radio base station.
Figure 2A:
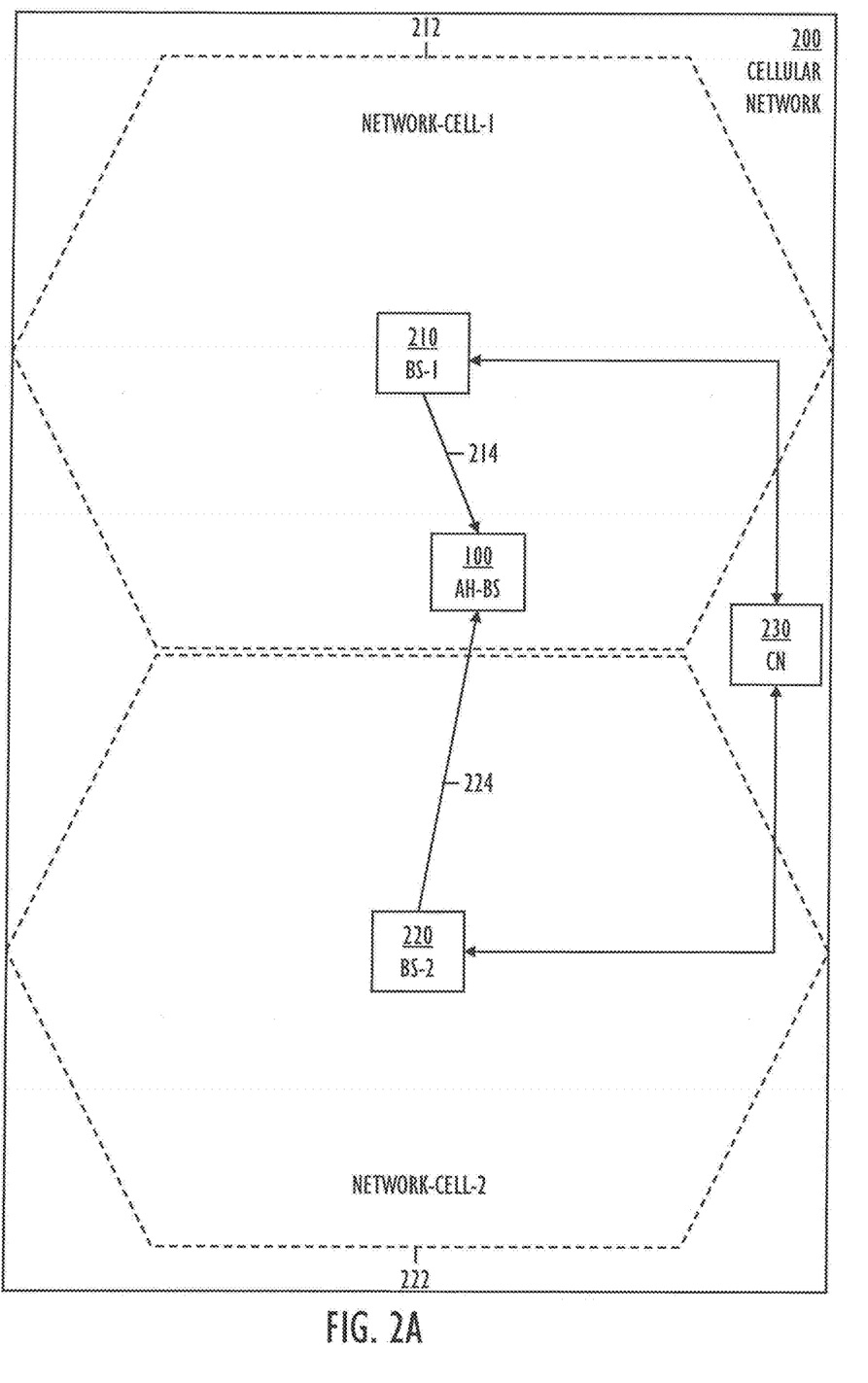
FIGS. 2A, 2B, and 2C illustrate an implementation of successive ad hoc cells using the ad hoc radio base station.
Figure 2B:
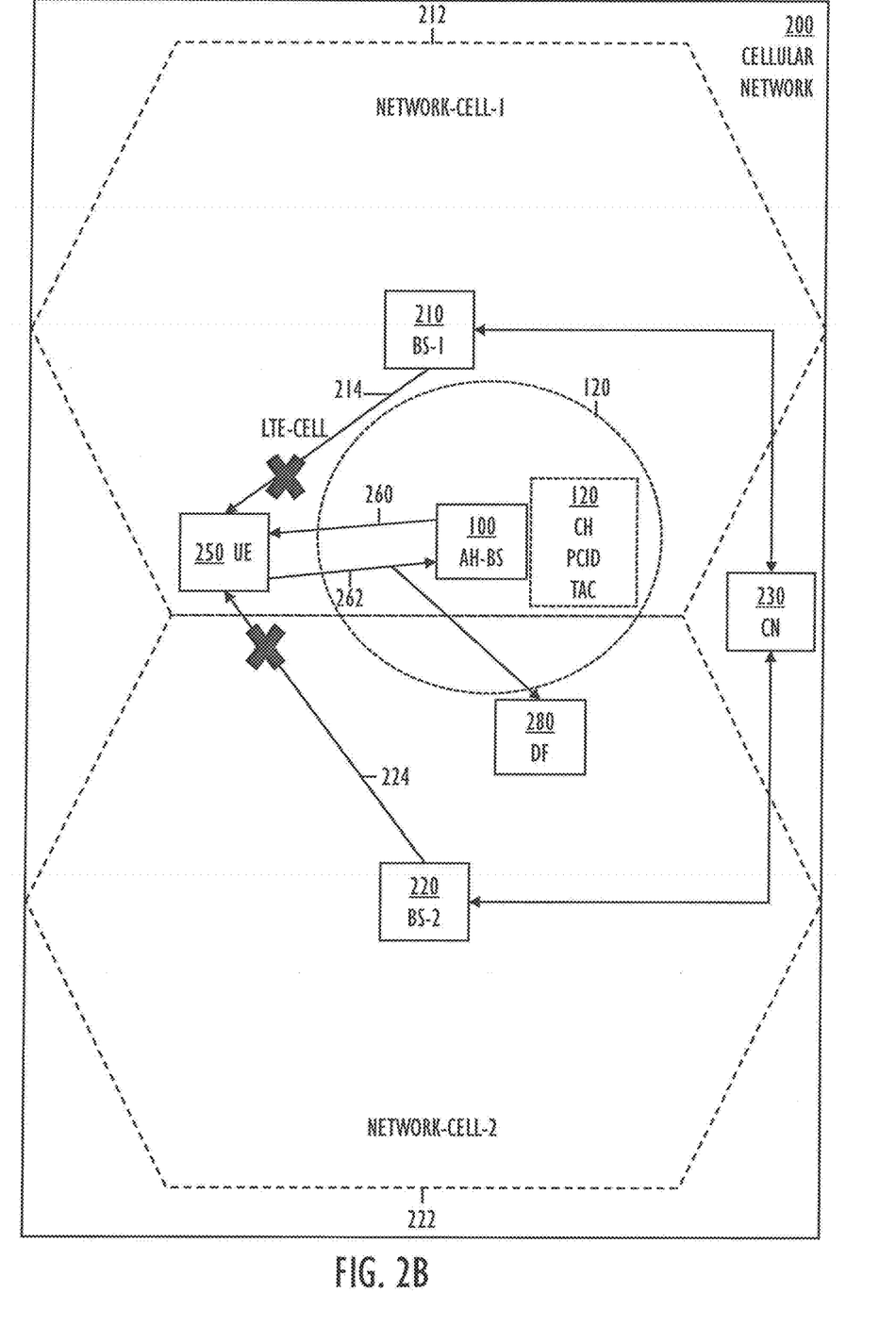
Figure 2C:
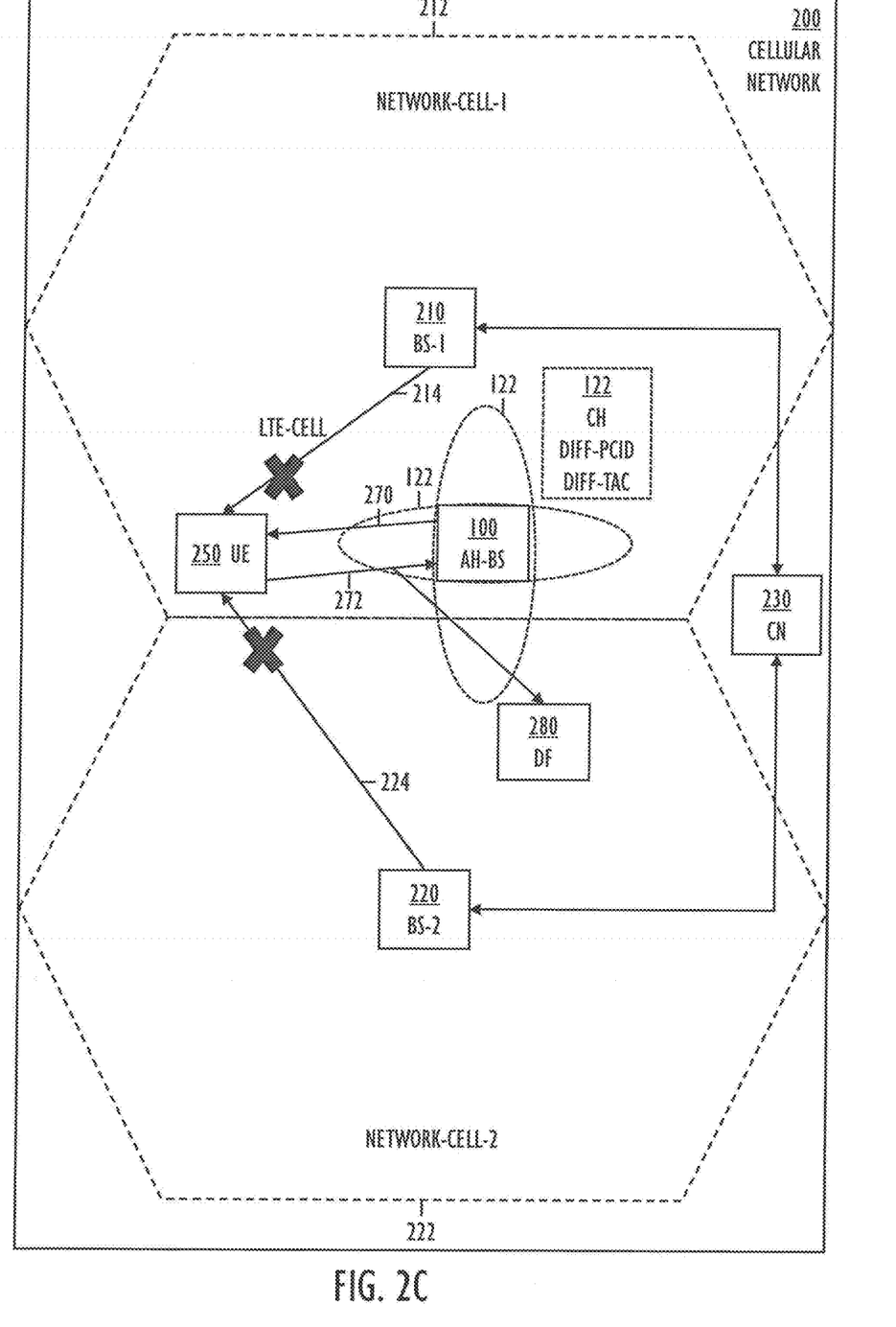

Let us study FIG. 1, which illustrates embodiments of an ad hoc radio base station 100, FIG. 2A, FIG. 2B, and FIG. 2C, which illustrate an implementation of ad hoc cells 120 and 122 using the ad hoc radio base station 100

An existing Long-Term Evolution (LTE) cellular radio network 200 is already in place and operating. The LTE cellular radio network 200 comprises one or more radio base stations 210, 220. Each radio base station 210, 220 provides an access for LTE user apparatuses 250 residing in a cell 212, 222 maintained by the radio base station 210, 220 to utilize communication resources of the LTE cellular radio network 200. The LTE cellular radio network 200 also comprises a core network 230 with numerous network elements. The radio base station (BS) 210, 220 may also be known as a base transceiver station (BTS), an access point (AP), or an eNodeB (eNB), for example.

The radio base station 210, 220 operates according to LTE technology, sometimes referred to as a fourth generation (4G), defined in numerous telecom standard specifications.

The LTE user apparatus 250 may also be known as a user equipment (UE), a radio terminal, a terminal device, a subscriber terminal, a smartphone, a mobile station, a mobile phone, a portable computer, a tablet computer, a smartwatch, smart glasses, a game terminal, a machine-type communication (MTC) apparatus, an IoT (Internet of Things) apparatus, a sensor apparatus, or some other type of wireless mobile communication device operating with or without a subscriber identification module (SIM) or an eSIM (embedded SIM). The LTE user apparatus 250 may be a device that is configured to associate the LTE user apparatus 250 and its user with a subscription and allows the user to interact with the LTE cellular radio network 200, i.e., the LTE user apparatus 250 is capable of requesting service from the LTE cellular radio network 200. The LTE user apparatus 250 may present information to the user and allow the user to input information. In other words, the LTE user apparatus 250 may be any apparatus capable of wirelessly receiving information from and/or wirelessly transmitting information to the LTE cellular radio network 200. Besides communication capabilities, the LTE user apparatus 250 may include computer functionalities, functionalities of other data processing devices, and/or one or more sensors for example.

In this example, the ad hoc radio base station 100 implements two ad hoc LTE cells 120 and 122 to operate in parallel with the existing LTE cells 212, 222. The ad hoc radio base station 100 may be used in a surveillance operation (such as in communications intelligence, or COMINT) to gather information regarding the user apparatus 250. In other words, the main reason to add the ad hoc radio base station 100 to an area is to get LTE user apparatuses 250 to connect to the ad hoc radio base station 100.

In an embodiment, the ad hoc LTE cell 120 is an omni-directional cell and the ad hoc LTE cell 122 is a directional cell. These are described in detail below.

The ad hoc radio base station 100 comprises one or more radio transceivers 102 configured to receive and transmit in the LTE cellular radio network 200 and means for causing performance of the ad hoc radio base station 100. In an embodiment, the means comprise one or more processors 104.

In an embodiment illustrated in FIG. 1, the one or more processors 104 comprise one or more memories 108 including computer program code 110, and one or more microprocessors 106 configured to execute the computer program code 110 to cause the performance of the ad hoc radio base station 100.

In an alternative embodiment, the means comprise a circuitry configured to cause the performance of the ad hoc radio base station 100.

A non-exhaustive list of implementation techniques for the one or more microprocessors 106 and the one or more memories 108, or the circuitry includes, but is not limited to: logic components, standard integrated circuits, application-specific integrated circuits (ASIC), system-on-a-chip (SoC), application-specific standard products (ASSP), microprocessors, micro-controllers, digital signal processors, special-purpose computer chips, field-programmable gate arrays (FPGA), and other suitable electronics structures.

The term 'memory' 108 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semi-conductor, or any other means of implementing an electrical computer memory.

The computer program code (or software) 110 may be written by a suitable programming language (such as C, C++, assembler, or machine language, for example), and the resulting executable code may be stored in the one or more memories 108 and run by the one or more microprocessors 106. The computer program code implements the method/algorithm illustrated in FIG. 3A and FIG. 3B. The computer program code 110 may be stored in a source code form, object code form, executable form, or in some intermediate form, but for use in the one or more microprocessors 106 it is in the executable form. There are many ways to structure the computer program code 110: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program code 110 for performing a wide variety of standard operations. In addition, an operating system (such as a general-purpose operating system or a real-time operating system) may provide the computer program code 110 with system services.

An embodiment provides a computer-readable medium 112 storing the computer program code 110, which, when loaded into the one or more microprocessors 106 and executed by the one or more microprocessors 106, causes the performance of the computer-implemented method/algorithm. The computer-readable medium 112 may comprise at least the following: any entity or device capable of carrying the computer program code 110 to the one or more microprocessors 106, a record medium, a computer memory, a read-only memory, an electrical carrier signal, a telecommunications signal, and a software distribution medium. In some jurisdictions, depending on the legislation and the patent practice, the computer-readable medium 112 may not be the telecommunications signal. In an embodiment, the computer-readable medium 112 is a computer-readable storage medium. In an embodiment, the computer-readable medium 112 is a non-transitory computer-readable storage medium.

Figure 3:
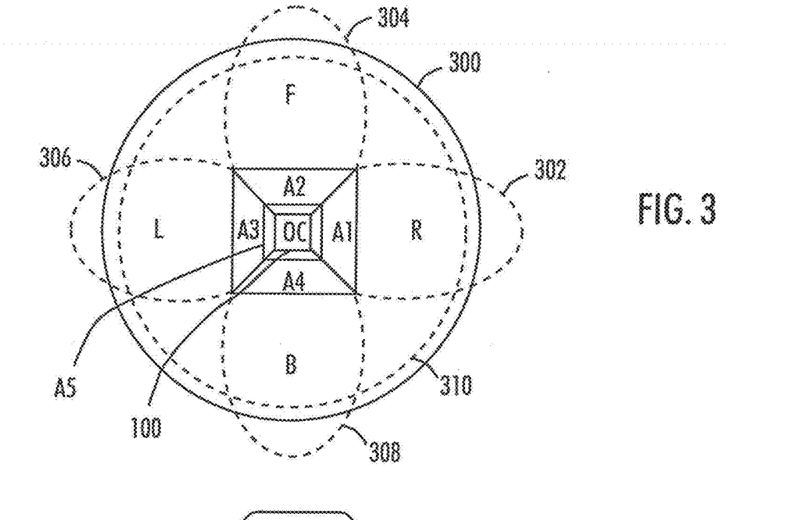
FIG. 3 illustrates an example of two ad hoc cells.

FIG. 3 illustrates an example of the two ad hoc cells. The figure shows the ad hoc radio base station (100) configured to setup two ad hoc cells.

The first cell 120 of the two ad hoc LTE cells provides an omnidirectional coverage area 300. With an omnidirectional antenna OA.

The second cell 122 of the ad hoc LTE cells provides a directional cell. In an embodiment, a set of directional or beamforming antennas A1, A2, A3, A4 and A5 are utilized. The main lobes of the set of directional antennas are directed at different directions from each other. In the example of FIG. 3, the directional or beamforming antenna A1 provides a main lobe 302, the directional or beamforming antenna A2 provides a main lobe 304, the directional or beamforming antenna A3 provides a main lobe 306, and the directional or beamforming antenna A4 provides a main lobe 308. In this example, the main lobes are all perpendicular to each other. In an embodiment, also a fifth directional antenna A5 may be used and provides a main lobe 310, which is perpendicular to all other main lobes. Thus, it points upwards if the cell is on the ground or downwards if the cell is airborne. In an embodiment, only one directional antenna and main lobe 302, 304, 306, 308, 310 is active in the second cell 122 at a time.

In following the term directional antenna is used. However, one skilled in the art is well aware that a directional antenna may be realised with a beamforming antenna, the direction of the main lobe of the antenna being controllable. If beamforming antennas are used, the number of antennas may be different than described above. For example, antennas A1, A2, A3, A4 may be combined in to one or more beamforming antennas.

Figure 4:
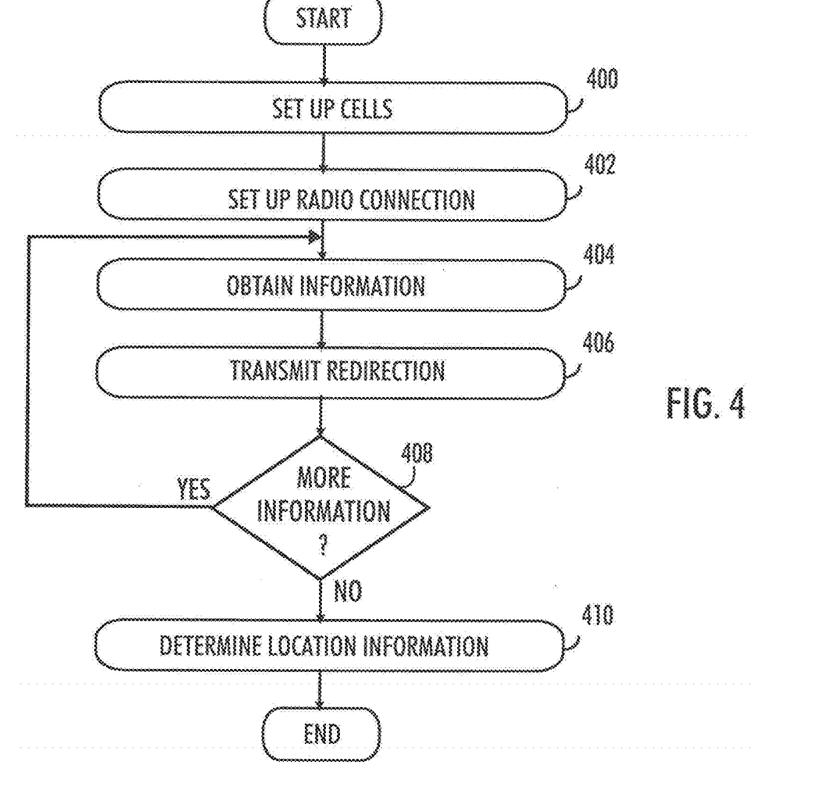
FIG. 4 is a flow chart illustrating an embodiment.

Now that the structure of the ad hoc radio base station 100 and its operating environment have been described, let us study an embodiment of the invention with reference to the flowchart of FIG. 4. The operations are not strictly in chronological order and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The flowchart illustrates the operation of the ad hoc radio base station 100 or a part of the base station.

In step 400, the ad hoc radio base station is configured to set up two ad hoc LTE cells 120, 122, each cell on a channel number with a Physical Cell ID, PCID and a Tracking Area Code, TAC or a Scrambling Code and a Location Area Code (LAC)/Routing Area Code (RAC). A first cell 120 of the two ad hoc LTE cells provides an omnidirectional coverage area 300; and the second cell 122 of the ad hoc LTE cells provides a directional cell, utilizing a set of directional antennas A1, A2, A3, A4 and A5, the main lobes 302, 304, 306, 308, 310 of the antennas of the cells being directed at different directions from each other, one directional antenna of the second cell being active at a time.

A Physical Cell ID, PCID and a Tracking Area Code, TAC are used in LTE and 5G systems and a Scrambling Code and a Location Area Code (LAC)/Routing Area Code (RAC) are used in 3G based systems.

In step 402, the ad hoc radio base station is configured to set up a radio connection in one of the two ad hoc LTE cells to an LTE user apparatus using a Random Access Channel, RACH, procedure.

In step 404, the ad hoc radio base station is configured to obtain information on the signal-to-noise ratio measured by the user apparatus from the signal received by the user apparatus and Timing Advance required on the radio connection.

In step 406, the ad hoc radio base station is configured to transmit a Radio Resource Control, RRC, release message with a redirection to other cell of the two ad hoc LTE cells in the first radio connection to the LTE user apparatus.

This causes the user apparatus to switch the radio connection to the redirected cell.

In step 408, the ad hoc radio base station is configured to repeat the above obtaining and transmitting steps a given number of times.

In step 410, the ad hoc radio base station is configured to determine the location of the LTE user apparatus based on the obtained information.

It may be noted here that the above steps may also be realized with two or more separate ad hoc radio base stations instead of one ad hoc radio base station. One skilled in the art is aware of the small changes in the above procedure that may be needed in case two or more base stations are used.

Some embodiments are now presented referring to FIGS. 1, 4 and 5A to 5E.

When the ad hoc radio base station 100 is being set up, information regarding the existing LTE cells 212, 222 is obtained. In an embodiment, the ad hoc radio base station 100 may either comprise a radio scanner (possibly utilizing the one or more radio transceivers 102) to scan a predetermined radio spectrum to generate the information, or the ad hoc radio base station 100 may receive the information from an external radio scanner. The information may at least partly be obtained by receiving 214, 224 system information from the existing LTE cells 212, 222. The information may include SIB1 (SystemInformationBlockType1). The ad hoc radio base station 100 may retrieve 114 at least a part of the information from an internal or external data source 116, such as from an internal or external database.

As mentioned, in 400, the two ad hoc LTE cells are setup, each on a channel number with a Physical Cell ID (PCID), and a Tracking Area Code (TAC). The channel number may be selected such that it is not in use in the adjacent existing LTE cells 212, 222.

In an embodiment, the channel number is defined as an E-UTRA Absolute Radio Frequency Channel Number (EARFCN). EARFCN may be an integer in a range from 0 to 65535.

As mentioned, in 402, the ad hoc radio base station is configured to set up a radio connection in one of the two ad hoc LTE cells to an LTE user apparatus. For example, assume that the cell 122 is set up and antenna A1 with the main lobe 302 or "R" beam is activated. The ad hoc LTE cell 302 starts to serve the LTE user apparatus 250 via antenna A1. Instead of providing full service with data and/or speech transmission, the ad hoc LTE cell 122 keeps the LTE user apparatus 250 connected so that appropriate surveillance operations may be performed. As shown in FIG. 2B, the LTE user apparatus 250 may receive transmissions 214, 224 from the existing LTE base stations 210, 220, but a transmission 260 from the ad hoc LTE base station 100 is received with a higher power and/or a better quality at the LTE user apparatus 250, which causes that the LTE user apparatus 250 connects 262 to the ad hoc LTE base station 100.

The radio connection 260, 262 is set up in the ad hoc LTE cell 122 to the LTE user apparatus 250 using a Random Access Channel (RACH) procedure. In an embodiment, a transmission power of the ad hoc LTE cell is set such that LTE user apparatuses 250 residing in the ad hoc LTE cell inevitably connect to the ad hoc LTE cell (instead of the LTE cells 212, 222 of the existing cellular radio network 200).

Figure 5A:
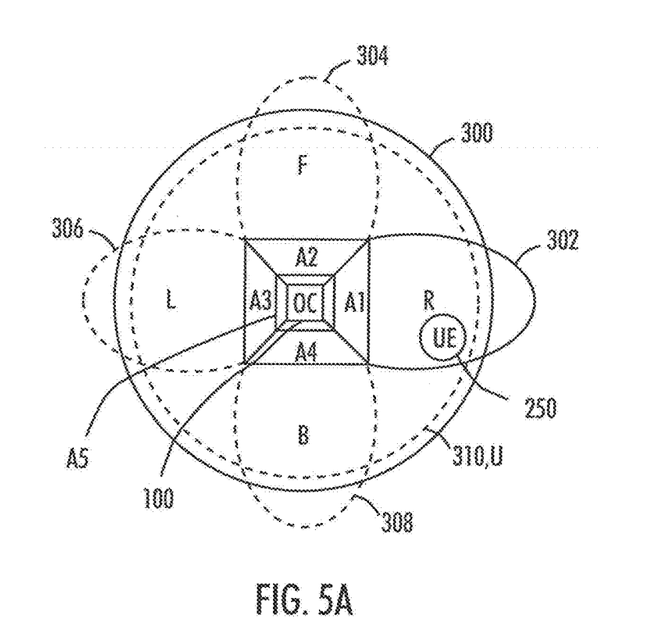
FIGS. 5A, 5B, 5C, 5D, and 5E illustrate examples of operation with two ad hoc cells.

In an embodiment, at this point the omnidirectional cell 120 is active and transmitting as well but the other directional antennas A2, A3, A4 and A5 are not active and utilized. FIG. 5A illustrates this with showing main lobe 302 as a solid line and other main lobes 304, 306, 308 or coverage areas 310 as dashed lines.

The ad hoc radio base station is configured to receive from the user apparatus 250 information on the signal-to-noise ratio measured by the user apparatus and Timing Advance required on the radio connection.

In an embodiment, the user apparatus transmits the information automatically.

In an embodiment, the ad hoc radio base station transmits a request to the user apparatus to transmit the information and the user apparatus transmits the requested information as a response to the request.

The ad hoc radio base station is then configured to transmit a Radio Resource Control, RRC, release message with a redirection to other cell of the two ad hoc LTE cells in the first radio connection to the LTE user apparatus.

In an embodiment, the user apparatus is redirected to the first cell 120 providing the omnidirectional coverage area 300.

The ad hoc radio base station is configured to receive from the user apparatus 250 information on the signal-to-noise ratio measured by the user apparatus and Timing Advance required on the radio connection.

In an embodiment, the user apparatus transmits the information automatically.

In an embodiment, the ad hoc radio base station transmits a request to the user apparatus to transmit the information and the user apparatus transmits the requested information as a response to the request.

While this is done, the ad hoc radio base station is configured, in an embodiment, to switch the transmission of the second cell 122 through antenna A1 to transmission on antenna A2, i.e., main lobe 304 or "F" beam. The situation is now as in FIG. 5B.

Figure 5B:
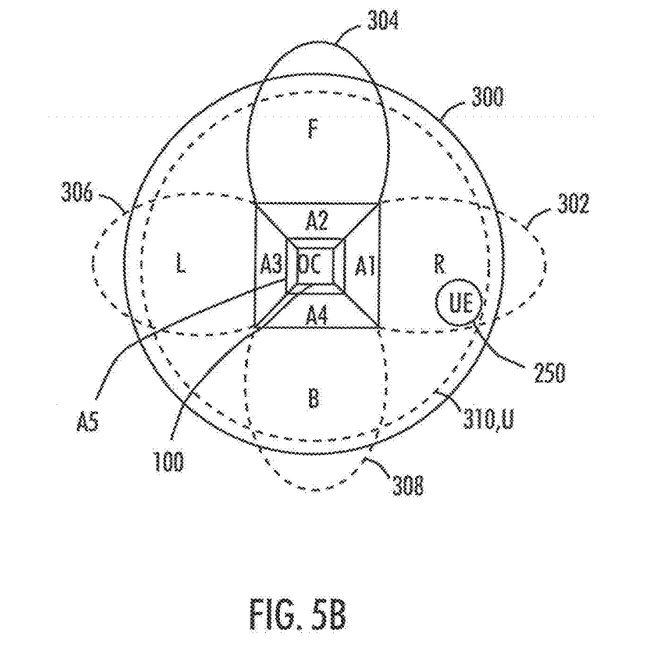

The ad hoc radio base station is then configured to transmit a Radio Resource Control, RRC, release message with a redirection to the second cell of the two ad hoc LTE cells in the first radio connection to the LTE user apparatus. The second cell communicates with the user apparatus via the main lobe 304 or "F" beam.

The process continues as described above with measurement by the user apparatus 250 either automatically or response to a request. As the main lobe 304 or "F" beam is in this example directed away from the user apparatus, the link quality and the signal strength received by the user apparatus is lower than when the main lobe 302 or "R" beam was used.

Then ad hoc radio base station is the configured to transmit a Radio Resource Control, RRC, release message with a redirection to other cell of the two ad hoc LTE cells in the first radio connection to the LTE user apparatus.

In an embodiment, the user apparatus is redirected again to the first cell 120 providing the omnidirectional coverage area 300.

While the user apparatus is connected to the first cell 120, the process continues as described above with measurement by the user apparatus 250 either automatically or response to a request.

While this is done, the ad hoc radio base station is configured, in an embodiment, to switch the transmission of the second cell 122 through antenna A2 to transmission on antenna A3, i.e., main lobe 306 or "L" beam. The situation is now as in FIG. 5C.

Figure 5C:
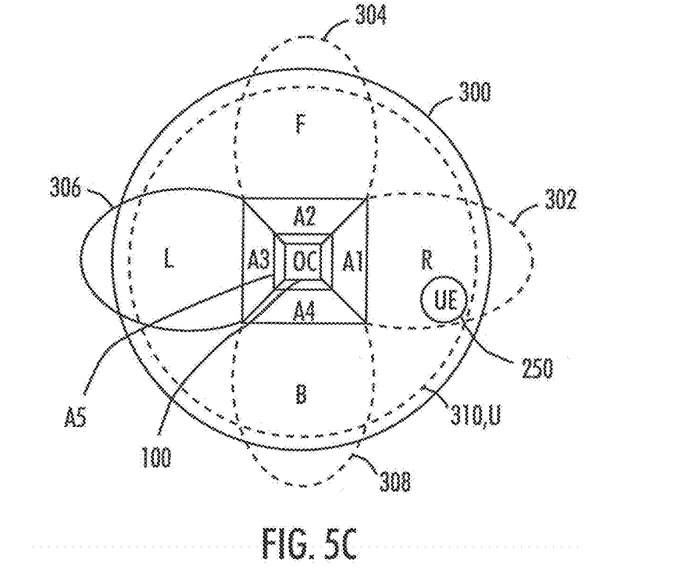

The process continues as described above with measurement by the user apparatus 250 either automatically or response to a request. As the main lobe 306 or "L" beam is in this example directed in the opposite direction from the user apparatus, the link quality and the signal strength received by the user apparatus is lower than when the main lobe 302 or "R" beam was used as the user apparatus receives transmission via the back lobe of antenna A3.

Then ad hoc radio base station is the configured to transmit a

Radio Resource Control, RRC, release message with a redirection to other cell of the two ad hoc LTE cells in the first radio connection to the LTE user apparatus.

In an embodiment, the user apparatus is redirected again to the first cell 120 providing the omnidirectional coverage area 300.

While the user apparatus is connected to the first cell 120, the process continues as described above with measurement by the user apparatus 250 either automatically or response to a request.

While this is done, the ad hoc radio base station is configured, in an embodiment, to switch the transmission of the second cell 122 through antenna A3 to transmission on antenna A4, i.e., main lobe 308 or "B" beam. The situation is now as in FIG. 5D.

Figure 5D:
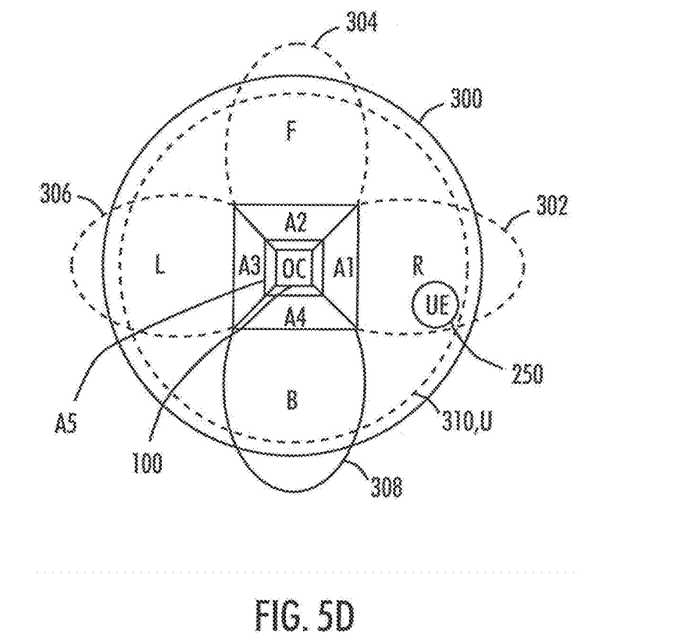

The ad hoc radio base station is the configured to transmit a Radio Resource Control, RRC, release message with a redirection to the second cell of the two ad hoc LTE cells in the first radio connection to the LTE user apparatus. The second cell communicates with the user apparatus via the main lobe 308 or "B" beam.

The process continues as described above with measurement by the user apparatus 250 either automatically or response to a request. As the main lobe 308 or "B" beam is in this example directed away from the user apparatus, the link quality and the signal strength received by the user apparatus is lower than when the main lobe 302 or "R" beam was used.

Then ad hoc radio base station is the configured to transmit a Radio Resource Control, RRC, release message with a redirection to other cell of the two ad hoc LTE cells in the first radio connection to the LTE user apparatus.

In an embodiment, the user apparatus is redirected again to the first cell 120 providing the omnidirectional coverage area 300.

While the user apparatus is connected to the first cell 120, the process continues as described above with measurement by the user apparatus 250 either automatically or response to a request.

While this is done, the ad hoc radio base station is configured, in an embodiment, to switch the transmission of the second cell 122 through antenna A4 to transmission on antenna A5, i.e., the antenna is directed upwards if the ad hoc radio base station is on the ground or downwards if the ad hoc radio base station is airborne. The situation is now as in FIG. 5E.

Figure 5E:
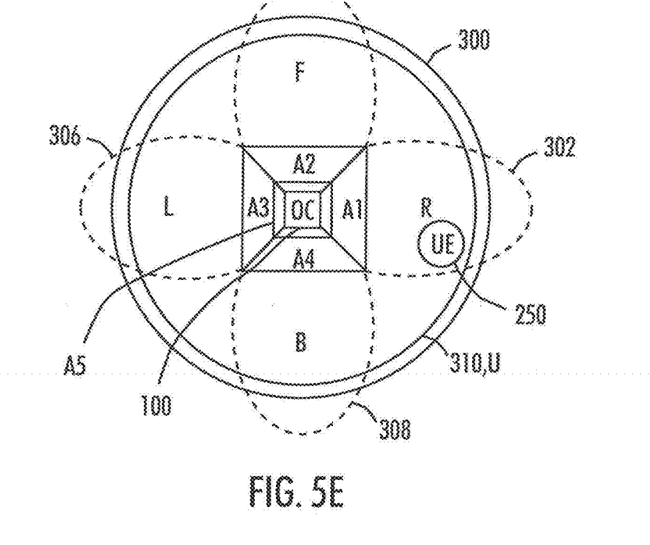

The ad hoc radio base station is the configured to transmit a Radio Resource Control, RRC, release message with a redirection to the second cell of the two ad hoc LTE cells in the first radio connection to the LTE user apparatus. The second cell communicates with the user apparatus via the coverage area 310 provided by antenna A5.

The process continues as described above with measurement by the user apparatus 250 either automatically or response to a request. As the coverage area 310 or "U" beam is in this example directed away from the user apparatus, the link quality and the signal strength received by the user apparatus is lower than when the main lobe 302 or "R" beam was used.

The above omni-directional-measurement cycle may be repeated if accuracy of the measurements needs to be increased.

In an embodiment, if the signal-to-noise ratio measured by the user apparatus when being in radio connection utilizing a given directional antenna is below a given threshold, the measurement may be ignored when determining the location of the user apparatus.

In an embodiment, the system does not comprise the antenna A5 but the measurements are performed using directional antennas A1, A2, A3, and A4 and the antenna providing the omnidirectional coverage area.

In an embodiment, the system does not comprise the antenna A5 but additional antennas A1', A2', A3' and A4', which provide main lobes approximately to the same horizontal direction as antennas A1, A2, A3, and A4 but are tilted upwards a given number of degrees. This provides vertical diversity to the measurements.

The use of antenna A5 or additional antennas A1', A2', A3' and A4' may depend on the environment where the ad hoc radio base station is applied. For example, in environments where the line-of sight to user apparatuses is reduced, such as where there are blocks of flats, the use of the additional antennas or antenna A5 may be advantageous.

Figure 6:
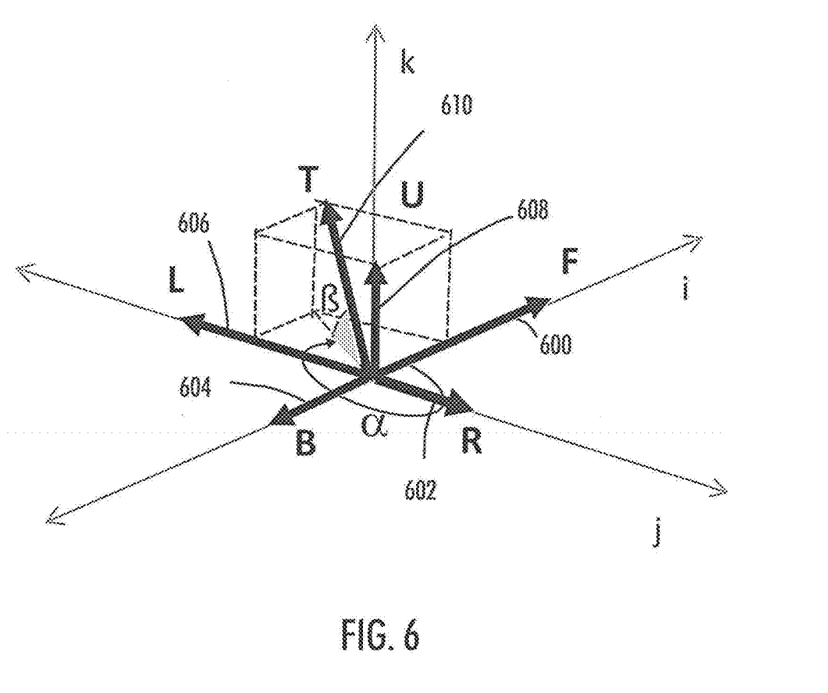
FIG. 6 illustrates an example of processing measurement data.

FIG. 6 illustrates an example of processing the measurement data obtained as described above and an example of determining the location of the user apparatus 250.

FIG. 6 shows a coordinate system with i, j and k-axes. The i-axis is aligned to the direction of the main lobe 304 or F-beam and the main lobe 308 or B-beam, the j-axis is aligned to the direction of the main lobe 302 or R-beam and the main lobe 306 or L-beam and the k-axis is aligned to the direction of the main lobe 310 or U-beam. The axes correspond to the measured signal-to-noise ratios of each main lobe or beam.

The bold vector $\overline{F}$ 600 illustrates the measured signal-to-noise ratio the user apparatus reported when connected to the main lobe 304 or F-beam. Correspondingly, the bold vector $\overline{R}$ 602 illustrates the measured signal-to-noise ratio the user apparatus reported when connected to the main lobe 302 or R-beam. The bold vector $\overline{B}$ 604 illustrates the measured signal-to-noise ratio the user apparatus reported when connected to the main lobe 308 or B-beam. The bold vector L 606 illustrates the measured signal-to-noise ratio the user apparatus reported when connected to the main lobe 306 or L-beam. Finally, the bold vector $\overline{U}$ 608 illustrates the measured signal-to-noise ratio the user apparatus reported when connected to the main lobe 310 or U-beam.

In an embodiment, compensation factors may be applied to equalize the antennas. The directional antenna gains may be normalized by using compensation factors, i.e., measurement values must be corrected based on those factors.

In an embodiment, the location of the user apparatus may be determined by forming three-dimensional vectors of the measured signal-to-noise ratio, taking into account the direction of the transmission from which the measurement has been made. By summing these vectors, a vector pointing to the location of the user apparatus is obtained.

In an embodiment, the signal-to-noise measurements may be scaled on a common scale to fit the (i,j,k) coordinate system of FIG. 6.

Now the vector $\overline{T}$ 610 pointing to the location of the user apparatus may be calculated as a sum $$\overline{T}=\overline{F}+\overline{B}+\overline{R}+\overline{L}+\overline{U}.$$

Horizontal relative Line-of-Bearing vector angle α may be calculated as angle of the vector T(hor) and vertical relative Line-of-Bearing vector angle β is the angle of between the vector T and its projection on i-j plane. The angles α and β can be calculated as follows:

$$\alpha=\arctan\ [(|\overline{R}|-|\overline{L}|),(|\overline{F}|-|\overline{B}|)], \alpha\in\{-\pi/\pi\}$$

$$\beta=\arcsin\ (|\overline{U}|/|\overline{T}|), \beta\in\{0,\pi/2\}.$$

In the calculation of α, a two-argument arctan function atan2(,) will map α to a correct quadrant.

In the above example, the main lobe 310 or U-beam is included in the process. The process is similar even when the main lobe 310 or U-beam is not used.

In an embodiment, measurements from all antennas or main lobes are not utilised. For example, in an embodiment where the main lobe 310 or U-beam is not used, the main lobe giving the best signal-to-noise ratio is determined. Then main lobes that are adjacent to the lobe providing the best signal-to-noise ratio are selected and the location of the user apparatus is determined utilizing measurement data from these main lobes.

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments. Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An ad hoc radio base station, comprising: one or more radio transceivers configured to receive and transmit in a cellular radio network; and one or more processors configured to cause performance of at least the following: setting up two ad hoc cells, each cell on a channel number with a Physical Cell ID, PCID and a Tracking Area Code, TAC or a Scrambling Code and a Location Area Code (LAC)/Routing Area Code (RAC); a first cell of the two ad hoc cells providing an omnidirectional cell; a second cell of the ad hoc cells providing a directional cell, utilizing a set of directional or beamforming antennas, main lobes of the antennas of the cells being directed at different directions from each other, one antenna of the second cell being active at a time; setting up a radio connection in one of the two ad hoc cells to an user apparatus using a Random Access Channel, RACH, procedure; obtaining information on the signal-to-noise ratio measured by the user apparatus from of the signal received by the user apparatus and Timing Advance required on the radio connection; transmitting a Radio Resource Control, RRC, release message with a redirection to other cell of the two ad hoc cells in the radio connection to the user apparatus, repeating the above obtaining and transmitting steps a given number of times; determining the location of the user apparatus based on the obtained information.

2. The ad hoc radio base station of claim 1, wherein the main lobes of the directional or beamforming antennas of the second cell are perpendicular to each other.

3. The ad hoc radio base station of claim 1, wherein the second cell of the ad hoc cells utilizes four directional or beamforming antennas each providing a main lobe on the same horizontal plane and perpendicular to each other and a fifth directional antenna, the main lobe of the fifth antenna being perpendicular to the main lobes of the four other directional antennas.

4. The ad hoc radio base station of claim 1, wherein the one or more processors are configured to cause performance of the following:
if the user apparatus is being served by the second cell, transmitting the Radio Resource Control, RRC, release message with a redirection to the first cell; and
if the user apparatus is being served by the first cell, transmitting the Radio Resource Control, RRC, release message with a redirection to the second cell, wherein the second cell is configured to activate a directional or beamforming antenna which did not serve the user apparatus before transferring the user apparatus to the first cell.

5. The ad hoc radio base station of claim 1, wherein the one or more processors are configured to cause performance of the following:
activating the directional or beamforming antennas in the second cell one by one at a time in a given order.

6. The ad hoc radio base station of claim 5, wherein the main lobe of the fifth directional antenna is directed upwards if the cell is on the ground or downwards if the cell is airborne.

7. The ad hoc radio base station of claim 1, wherein the one or more processors are configured to cause performance of the following:
determine a vector for two or more directional or beamforming antennas of the set of directional or beamforming antennas, the direction of the vector corresponding to the direction of the main lobe of the directional or beamforming antenna and the length of the vector corresponding to the signal-to-noise ratio measured by the user apparatus when being in radio connection utilizing the directional or beamforming antenna;
determine the location of the user apparatus based on the sum of the vectors.

8. The ad hoc radio base station of claim 1, wherein the one or more processors are configured to cause performance of the following:
if the signal-to-noise ratio measured by the user apparatus when being in radio connection utilizing a given directional or beamforming antenna is below a given threshold, ignore the measurement when determining the location of the user apparatus.

9. A method for locating a user apparatus, comprising: setting up two ad hoc cells, each cell on a channel number with a Physical Cell ID, PCID and a Tracking Area Code, TAC or a Scrambling Code and a Location Area Code (LAC)/Routing Area Code (RAC); a first cell of the two ad hoc cells providing an omnidirectional cell; a second cell of the ad hoc cells providing a directional cell, utilizing a set of directional or beamforming antennas, main lobes of the antennas of the cells being directed at different directions from each other, one antenna of the second cell being active at a time; setting up a radio connection in one of the two ad hoc cells to an user apparatus using a Random Access Channel, RACH, procedure; obtaining information on the signal-to-noise ratio measured by the user apparatus from of the signal received by the user apparatus and Timing Advance required on the radio connection; transmitting a Radio Resource Control, RRC, release message with a redirection to other cell of the two ad hoc cells in the radio connection to the user apparatus, repeating the above obtaining and transmitting steps a given number of times; determining the location of the user apparatus based on the obtained information.

10. The method of claim 9, wherein the main lobes of the directional antennas of the second cell are perpendicular to each other.

11. The method of claim 10, wherein the second cell of the ad hoc cells utilizes four directional or beamforming antennas each providing a main lobe on the same horizontal plane and perpendicular to each other and a fifth directional antenna, the main lobe of the fifth antenna being perpendicular to the main lobes of the four other directional or beamforming antennas.

12. The method of claim 9, further comprising:
transmitting the Radio Resource Control, RRC, release message with a redirection to the first cell, if the user apparatus is being served by the second cell; and
transmitting the Radio Resource Control, RRC, release message with a redirection to the second cell, if the user apparatus is being served by the first cell, wherein the second cell is configured to activate a directional or beamforming antenna which did not serve the user apparatus before transferring the user apparatus to the first cell.

13. The method of claim 9, further comprising:
determining a vector for two or more directional or beamforming antennas of the set of directional or beamforming antennas, the direction of the vector corresponding to the direction of the main lobe of the directional or beamforming antenna and the length of the vector corresponding to the signal-to-noise ratio measured by the user apparatus when being in radio connection utilizing the directional or beamforming antenna;
determining the location of the user apparatus based on the sum of the vectors.

14. The method of claim 9, further comprising:
activating the directional or beamforming antennas in the second cell one by one at a time in a given order.

15. A non-transitory computer-readable medium comprising computer program code, which, when executed by one or more microprocessors, causes performance of: setting up two ad hoc cells, each cell on a channel number with a Physical Cell ID, PCID and a Tracking Area Code, TAC or a Scrambling Code and a Location Area Code (LAC)/Routing Area Code (RAC); a first cell of the two ad hoc cells providing an omnidirectional cell; a second cell of the ad hoc cells providing a directional cell, utilizing a set of directional or beamforming antennas, main lobes of the antennas of the cells being directed at different directions from each other, one antenna of the second cell being active at a time; setting up a radio connection in one of the two ad hoc cells to an user apparatus using a Random Access Channel, RACH, procedure; obtaining information on the signal-to-noise ratio measured by the user apparatus from of the signal received by the user apparatus and Timing Advance required on the radio connection; transmitting a Radio Resource Control, RRC, release message with a redirection to other cell of the two ad hoc cells in the radio connection to the user apparatus, repeating the above obtaining and transmitting steps a given number of times; determining the location of the user apparatus based on the obtained information.

16. The non-transitory computer-readable medium of claim 15, wherein the main lobes of the directional antennas of the second cell are perpendicular to each other.

17. The non-transitory computer-readable medium of claim 16, wherein the second cell of the ad hoc cells utilizes four directional or beamforming antennas each providing a main lobe on the same horizontal plane and perpendicular to each other and a fifth directional antenna, the main lobe of the fifth antenna being perpendicular to the main lobes of the four other directional or beamforming antennas.

18. The non-transitory computer-readable medium of claim 15, further comprising:
transmitting the Radio Resource Control, RRC, release message with a redirection to the first cell, if the user apparatus is being served by the second cell; and
transmitting the Radio Resource Control, RRC, release message with a redirection to the second cell, if the user apparatus is being served by the first cell, wherein the second cell is configured to activate a directional or beamforming antenna which did not serve the user apparatus before transferring the user apparatus to the first cell.

19. The non-transitory computer-readable medium of claim 15, further comprising:
determining a vector for two or more directional or beamforming antennas of the set of directional or beamforming antennas, the direction of the vector corresponding to the direction of the main lobe of the directional or beamforming antenna and the length of the vector corresponding to the signal-to-noise ratio measured by the user apparatus when being in radio connection utilizing the directional or beamforming antenna;
determining the location of the user apparatus based on the sum of the vectors.

20. The non-transitory computer-readable medium of claim 15, further comprising:
activating the directional or beamforming antennas in the second cell one by one at a time in a given order.

* * * * *